United States Patent
McKay et al.

(10) Patent No.: US 10,739,089 B2
(45) Date of Patent: Aug. 11, 2020

(54) BI-DIRECTIONAL POROUS MEDIA PHASE CHANGE HEAT EXCHANGER

(71) Applicant: Massachusetts Institute of Technology, Cambridge, MA (US)

(72) Inventors: Ian Salmon McKay, Seattle, WA (US); Shankar Narayanan, Chestnut Hill, MA (US); Evelyn N. Wang, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 757 days.

(21) Appl. No.: 14/227,083

(22) Filed: Mar. 27, 2014

(65) Prior Publication Data
US 2020/0217587 A1 Jul. 9, 2020

(51) Int. Cl.
F28F 13/18 (2006.01)
F28F 19/02 (2006.01)

(52) U.S. Cl.
CPC .............. *F28F 13/18* (2013.01); *F28F 19/02* (2013.01); *F28F 2245/00* (2013.01)

(58) Field of Classification Search
CPC ......... F28F 13/18; F28F 19/02; F28F 2245/00
See application file for complete search history.

(56) References Cited

U.S. PATENT DOCUMENTS

| | | | | |
|---|---|---|---|---|
| 6,571,864 B1* | 6/2003 | Yoon | ....................... | A01N 43/40 165/133 |
| 6,623,613 B1* | 9/2003 | Mathies | ................ | B01L 3/5025 204/450 |
| 2007/0240860 A1* | 10/2007 | Meyer, IV | .......... | F28D 15/0233 165/104.26 |
| 2008/0210407 A1* | 9/2008 | Kim | .................... | F28D 15/0233 165/104.26 |
| 2011/0017431 A1* | 1/2011 | Yang | .................... | F28D 15/046 165/104.26 |

OTHER PUBLICATIONS

Miljkovic et al., Jumping-Droplet-Enhanced Condensation on Scalable Superhydrophobic Nanostructured Surfaces, Nano Letters, 2013, 179-187, 13, American Chemical Society, USA.
Malpass et al., Electrodeposition of Nickel on Carbon Felt, Electrochimica Acta, 2004, 4933-4938, 49, Elsevier Ltd, USA.

* cited by examiner

*Primary Examiner* — Elizabeth J Martin
*Assistant Examiner* — Nael N Babaa
(74) *Attorney, Agent, or Firm* — Steptoe & Johnson LLP (57) ABSTRACT

Heat exchange structure. A hydrophilic, thermally conductive porous medium includes nanostructures formed substantially uniformly throughout the porous medium providing a balance of capillary and viscous forces to self-regulate a liquid-vapor contact line. A suitable porous medium is copper. A method for making the structure is also disclosed.

5 Claims, 8 Drawing Sheets

BI-DIRECTIONAL POROUS MEDIA PHASE CHANGE HEAT EXCHANGER

This invention was made with government support under Grant No. DE-AR0000185 awarded by the Department of Energy. The government has certain rights in the invention.

BACKGROUND OF THE INVENTION

This invention relates to a bi-directional heat exchange structure that acts as both a high efficiency self-regulating evaporator and a high-contact angle condensation surface.

Thermo-adsorptive batteries store and release heat. Such thermal batteries may include hydrophilic nanostructured porous media, often copper, to enhance evaporation and condensation. Sintered copper particles, compressed open-cell copper foams and diffusion bonded metal mesh have been used as porous media for evaporation in the prior art. However, a limitation of these metallic substrates is the adsorption of organic contaminants in the course of normal operation which renders them either neutrally wetting or hydrophobic and therefore completely nonfunctional after a period of hours or days in normal operation.

An object of the present invention, therefore, is a heat exchange porous structure in which nanostructures therein are formed substantially uniformly throughout the porous structure to make the porous structure permanently hydrophilic in the presence of organic contaminants.

SUMMARY OF THE INVENTION

In a first aspect, the invention is a heat exchange structure including a hydrophilic, thermally conductive porous medium including nanostructures formed substantially uniformly throughout the porous medium to provide a balance of capillary and viscous forces to self-regulate a liquid-vapor contact line. In a preferred embodiment the porous medium is copper.

In another aspect, the invention is a method for making a heat exchange structure including anodizing a porous copper structure in an oxidizing alkaline medium at approximately 75° C., the oxidizing alkaline medium comprising a mixture of $NaClO_2$, $NaOH$, $Na_3PO_4 \cdot 12H_2O$ along with deionized water, whereby nanostructures are formed throughout the porous copper structure. In a preferred embodiment, the solution above has the components in the ratio 75:1:5:100 weight percent. The method may also include holding the porous medium at approximately 1.5 volts relative to a counter electrode in pulses of approximately 20 seconds duration with approximately 10 seconds between pulses to improve uniformity of nanostructure growth.

DESCRIPTION OF THE PREFERRED EMBODIMENT

The present invention has application in the charge-recharge cycling of thermo-adsorptive batteries, in increasing the power density of absorptive chillers, enabling bi-directional heat pumping by standard vapor compression cycles, and device temperature regulation and other thermal engineering applications.

Figure 1:
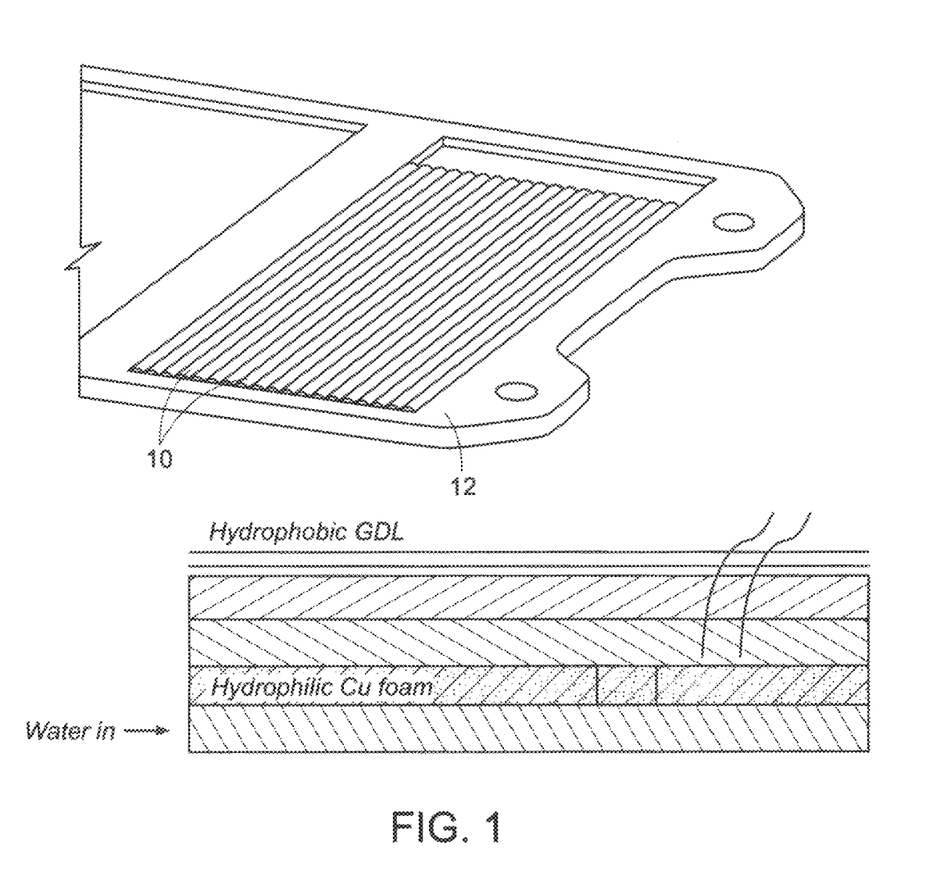
FIG. 1 is a schematic illustration showing the endothermic porous media according to an embodiment of the invention.
Figure 2:
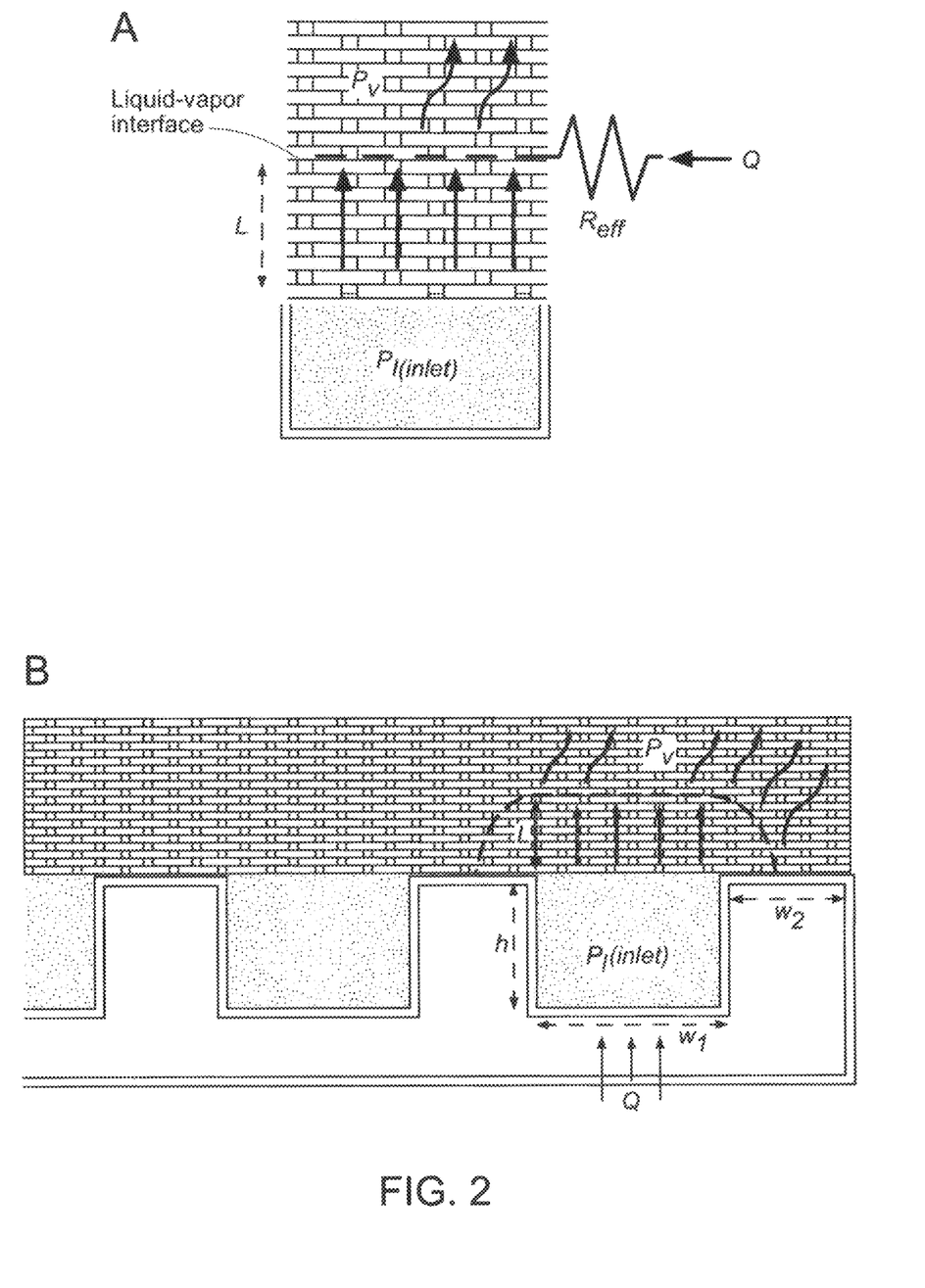
FIGS. 2a and 2b are schematic illustrations for optimal porous media thickness for a given power input range.

With reference to FIG. 1, in endothermic operation (evaporation), a liquid such as water is supplied to mini channels 10 underneath a porous media surface 12 and subsequently enters and evaporates within the porous media. Because of the balance of capillary and viscous forces, for a given porous media thickness and power delivery range, the porous media self-regulates the liquid-vapor contact line, and no pumping power or active throttling is required as shown in FIGS. 2a and 2b. This effect has been demonstrated experimentally. FIG. 1 also shows a hydrophobic gas diffusion layer (GDL) that may be applied as a hydrophobic cap to enhance condensation performance.

The present design requires a hydrophilic, thermally conductive porous medium to provide the thermal energy required for effective evaporation, and the capillary pressure and viscous losses required for self-regulation. To be effective, the porous structure must remain hydrophilic in the presence of organic contaminants.

To maintain the hydrophilic structures, the copper structure for evaporation surfaces is anodized in an oxidizing alkaline medium in a procedure similar to one described by Miljkovic, et al. [1], but with different concentrations of the oxidizing medium and at a lower temperature.

In particular, a suitable oxidizing alkaline medium includes sodium chlorite, sodium hydroxide, and sodium phosphate tribasic dodecahydrate in a selected ratio. A suitable ratio for the sodium chlorite, sodium hydroxide, and sodium phosphate tribasic dodecahydrate along with deionized water is (75:1:5:100 wt percent). The procedure is carried out at approximately 75° C. It is preferred that the sodium chlorite be added incrementally in four batches over eight hours.

The changes in procedure from that disclosed in [1] slow the growth of nanostructures such that nanostructures are formed substantially uniformly throughout the porous media, rather than saturating the surface and subsequently blocking ion transport to a central portion of a sample. Additionally, holding the copper porous medium at +1.5V relative to a Ni counter electrode in pulses of 20 seconds duration with 10 seconds between pulses was found to improve the uniformity of the nanostructure growth within 1.7 mm samples. By uniformity is meant that nanostructure growth occurs both in central portions of the sample as well as on the surface regardless of the relative sizes of respective particles.

This pulsed electrochemical technique was designed to retard nanostructure growth during the 20 seconds polarized phase, and also to forcibly reverse the concentration gradient within the oxidizing solution created by nanostructure growth. The present technique is modeled on an electroplating technique described in [2]. Even with these innovations, copper nanostructure size was significantly shorter in the center of the porous media samples (approximately 0.5 μm) than on the outside of the samples (approximately 2 μm). However, without the changes in the anodizing solution, the interior of the porous media exhibits no oxide growth.

Figure 3:
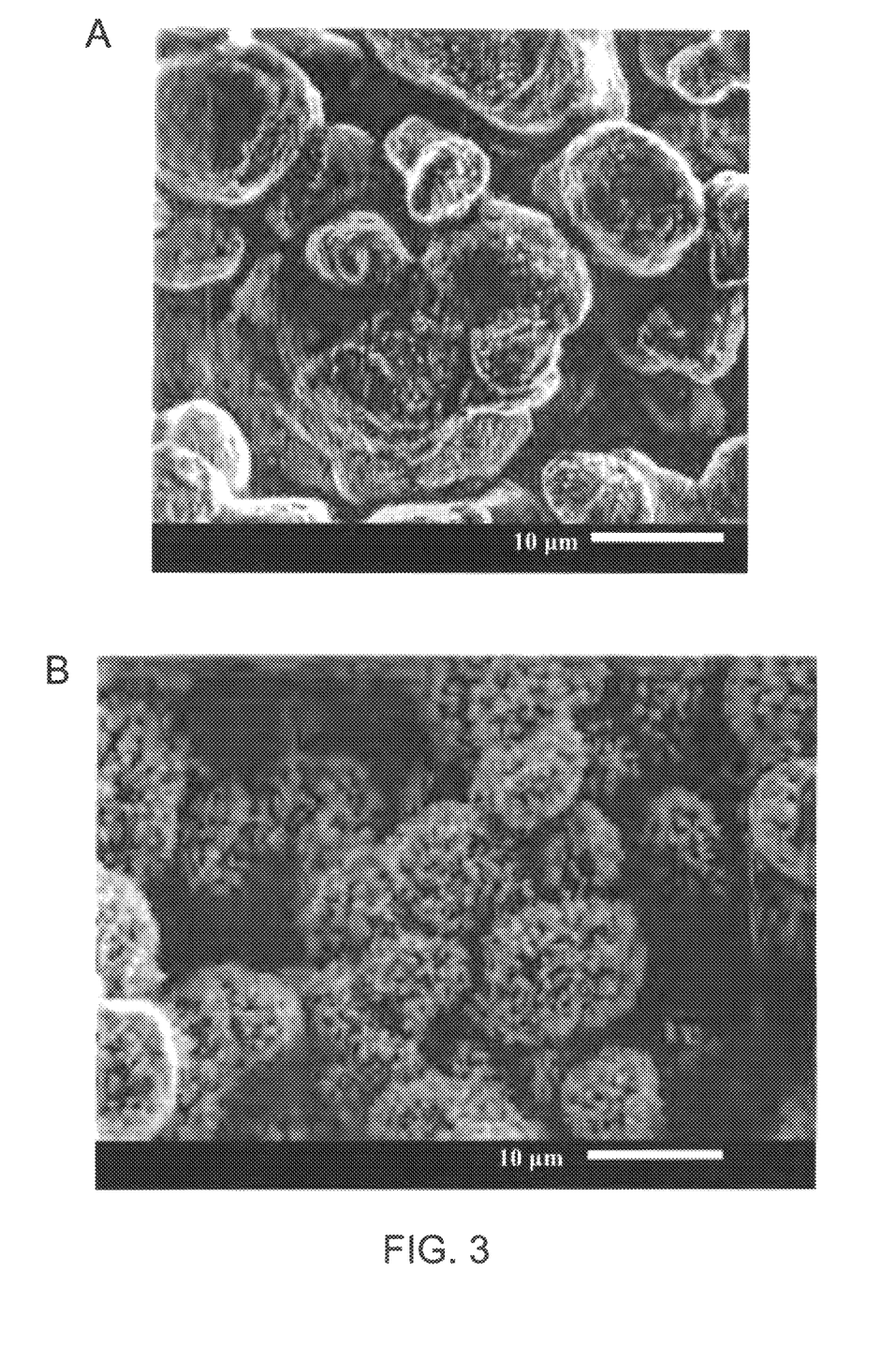
FIG. 3a is a micrograph showing a porous structure prepared by a prior art technique.
FIG. 3b is a micrograph of porous structure showing the interior of a sample prepared using the procedure disclosed herein.

FIG. 3a is a micrograph of a porous medium produced by the prior art technique as compared to the micrograph in FIG. 3b showing nanostructure growth.

The $CuO/Cu_2O$ nanostructures that form serve to make the copper porous medium permanently hydrophilic even in the presence of organic contaminants thereby paving the way for its use as an evaporation substrate in an exposed porous media evaporator. The surface made according to the present invention can sustain a heat flux comparable to literature values for evaporation from copper sinter substrates.

Figure 4:
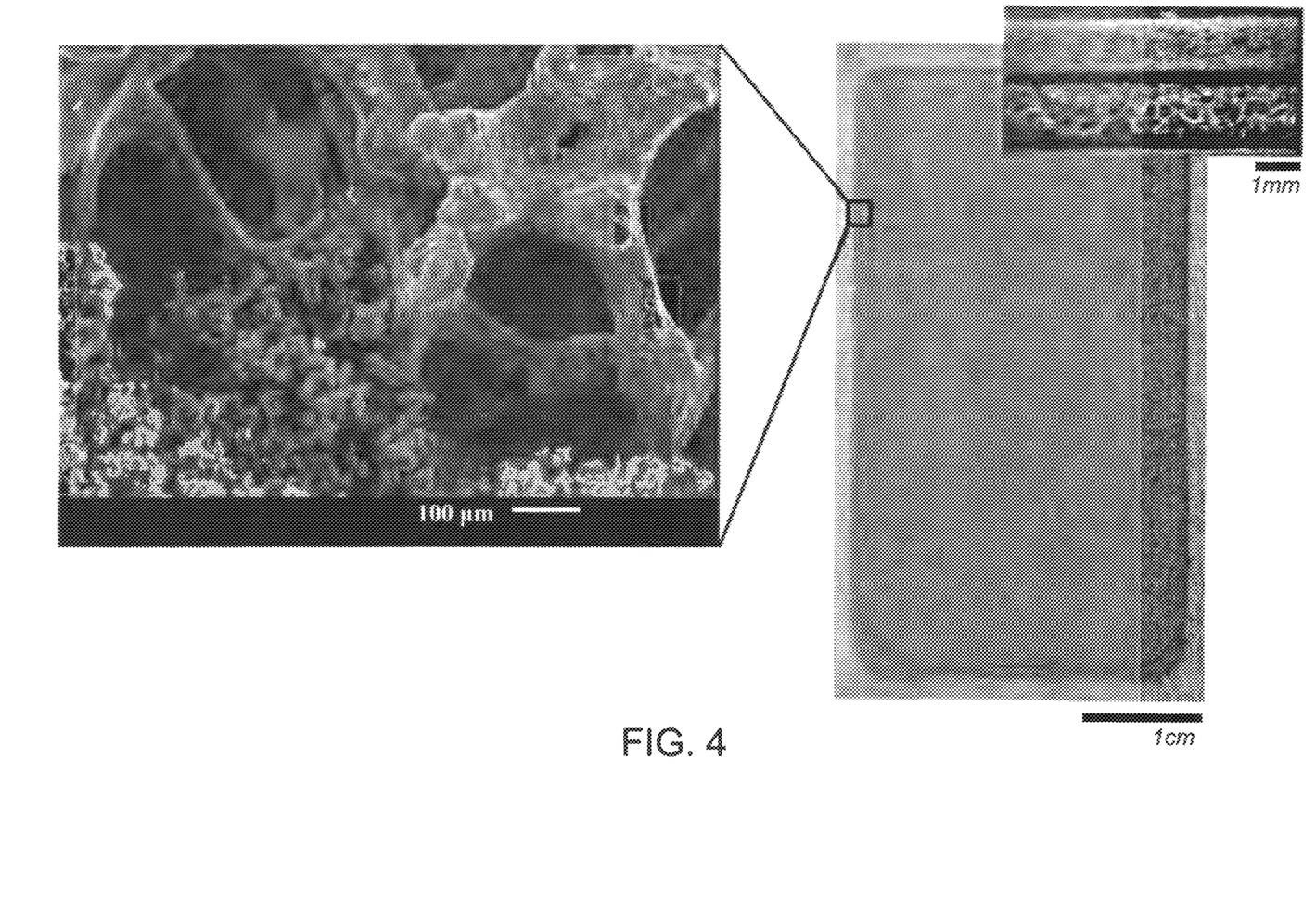
FIG. 4 is a micrograph and illustration of a double-layer porous medium with a porosity discontinuity.

The operating input pressure range for a given thickness porous medium evaporator according to the invention can be as narrow as 1 kPa. This narrow range can be problematic because the thin sinter samples which display the best thermal characteristics can flood if subjected to relatively small perturbations such as changes in orientation, or a change in the water pressure head on the order of 10 cm. In order to expand this range without compromising the self-regulating features of the sinter, the porous media are fabricated preferably in steps. Two copper sinters can be baked at different temperatures and then bonded together for a small porosity discontinuity at the diffusion bond interface. Similarly, a low porosity sinter can be fabricated and then diffusion bonded to a high-porosity open cell copper foam for a large porosity discontinuity at the diffusion bond interface as shown in FIG. 4.

Figure 5:
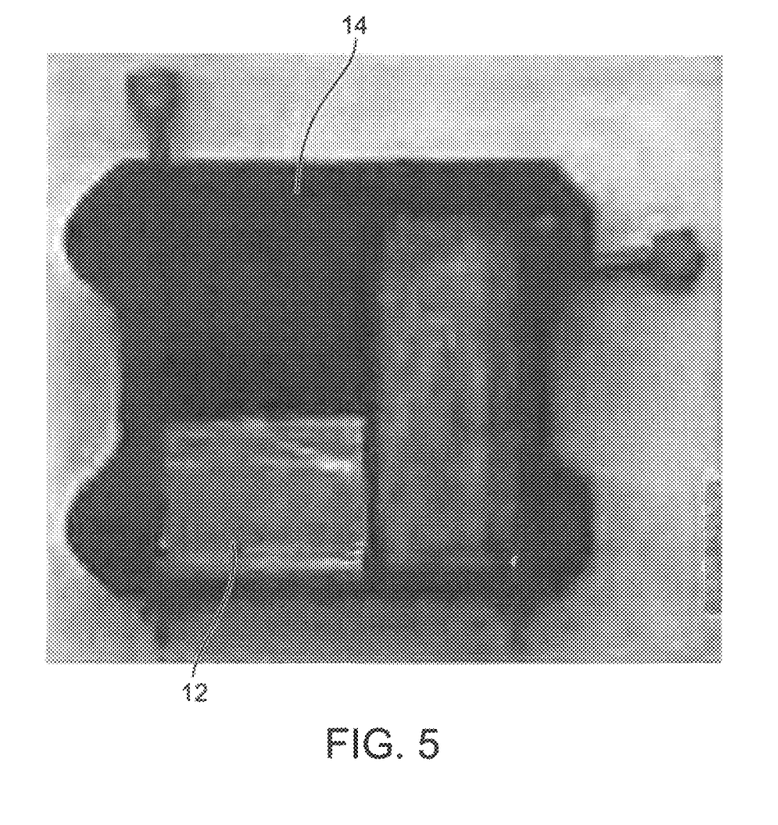
FIG. 5 is a photograph of bi-directional phase change heat exchanger with adjacent hydrophobic condensation and hydrophilic evaporation regions.

In order to achieve hi-directional heat transfer, drop wise condensation can be supported by a hydrophobic nonporous region 14 adjacent the hydrophilic porous media evaporator 12 as shown in FIG. 5.

Figure 6:
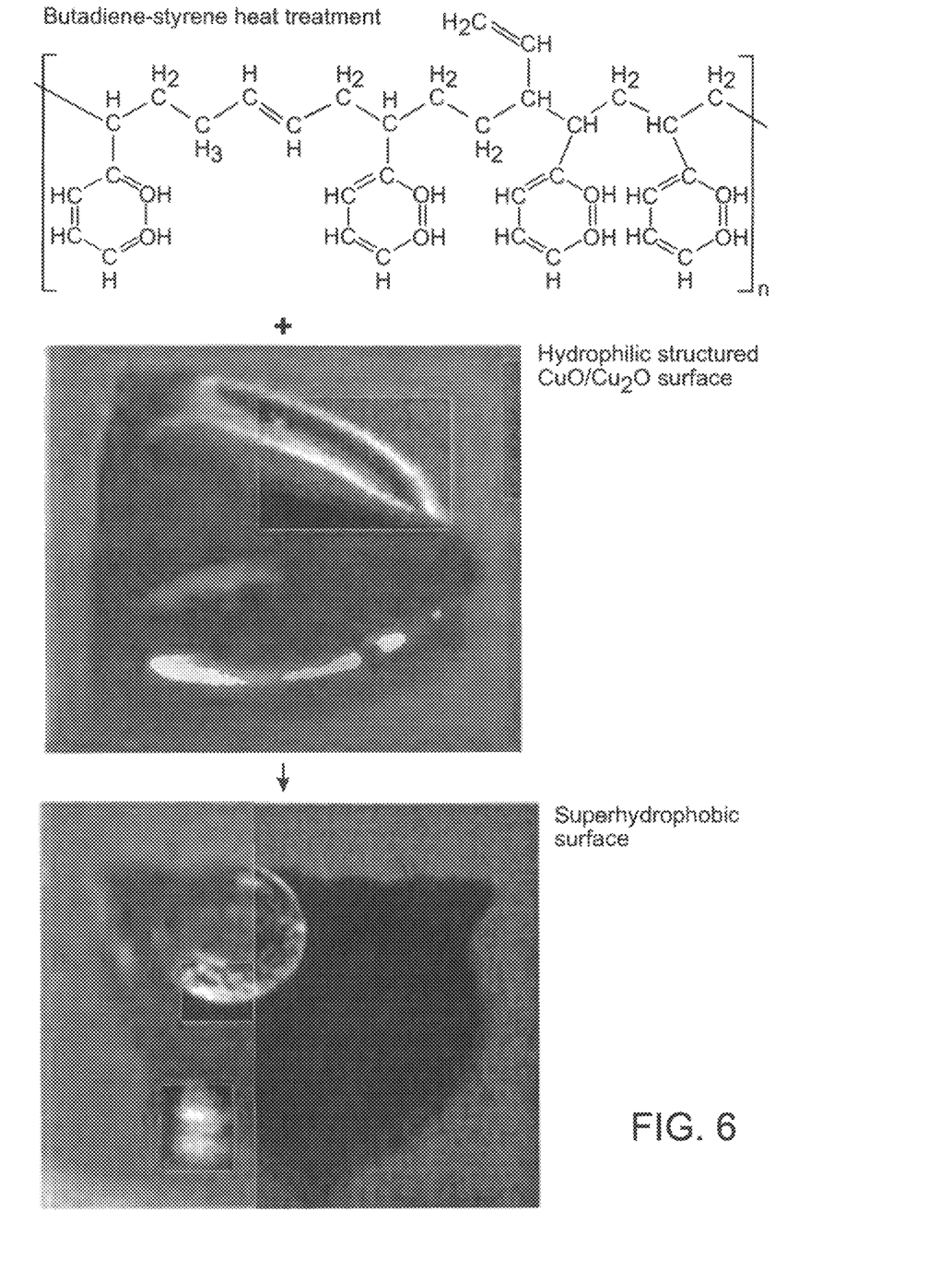
FIG. 6 is an illustration of a butadiene-styrene heat treatment that renders the porous media surface hydrophobic without changing the wetting behavior of the bulk material.

If, as in the case of a thermo adsorptive battery, evaporation performance (discharge) is more critical than condensation performance (recharge), the entire surface of the phase change heat exchanger can be occupied by the porous media evaporator. In this case, condensation on the porous media can be modestly enhanced by the application of a hydrophobic coating or cap layer to an external side of the porous media. Semiconformal butadiene-styrene coating was applied to the surface only of the nanostructured porous media via heat treatment in air at 130° C. as shown in FIG. 6. The wetting characteristics of the coating results in an approximately 50% improvement in condensation on $H_2O$-saturated porous media over condensation on noncoated porous media at 2.2 kPa. The hydrophobic cap layer may be silicone or a teflon based porous membrane placed directly over the hydrophilic porous media. The cap layer is important for enhancing the condensation performance of the heat exchanger and for preventing flooding of the heat exchanger in evaporator mode.

Figure 7:
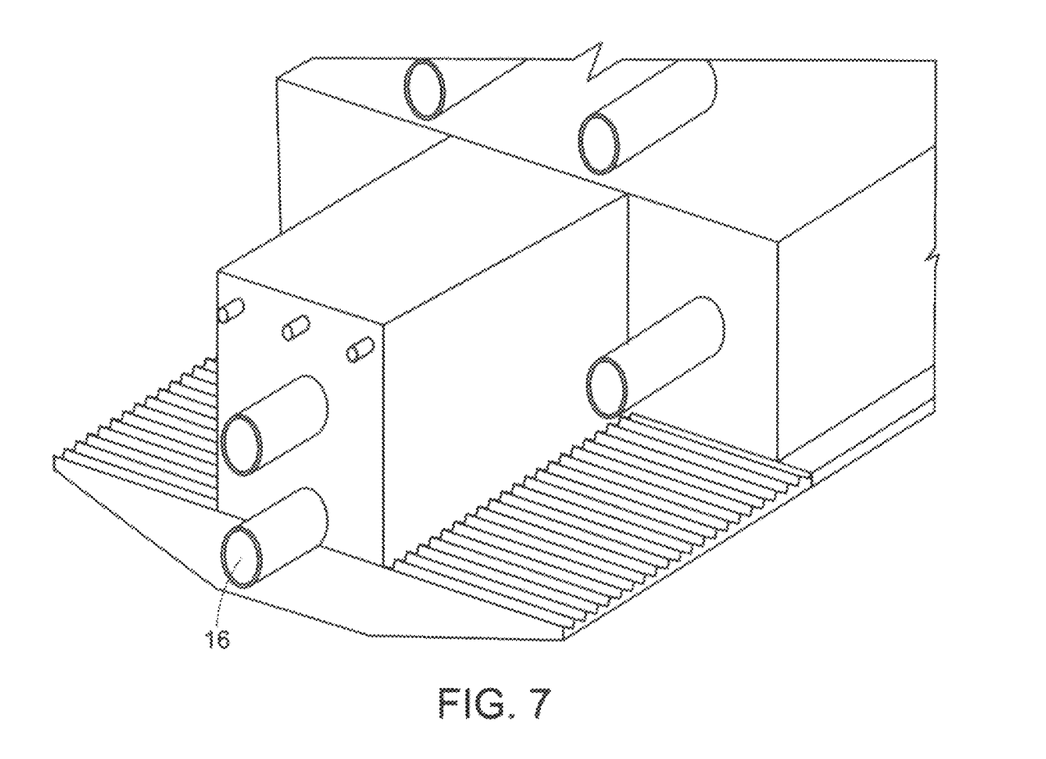
FIG. 7 is a perspective view of a finned tube bi-directional phase change heat exchanger design.
Figure 8:
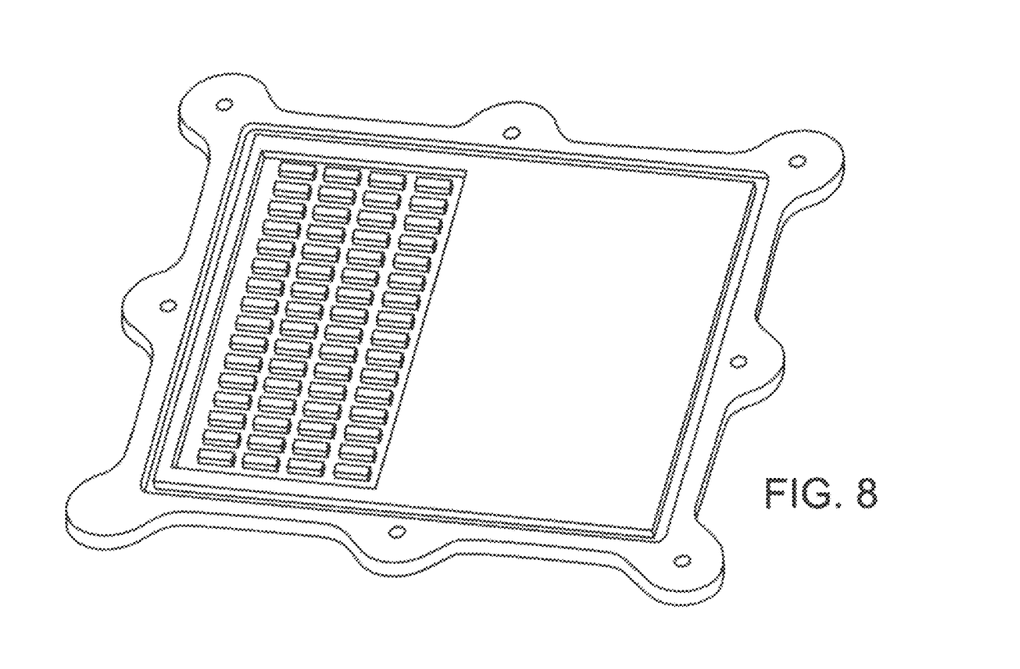
FIG. 8 is a perspective view showing the flow channel configuration for a flat plate design.

For high-flux applications, the structure of the invention could take the shape of a finned tube 16 as shown in FIG. 7. A flat-plate flow channel design is shown in FIG. 8.

Figure 9:
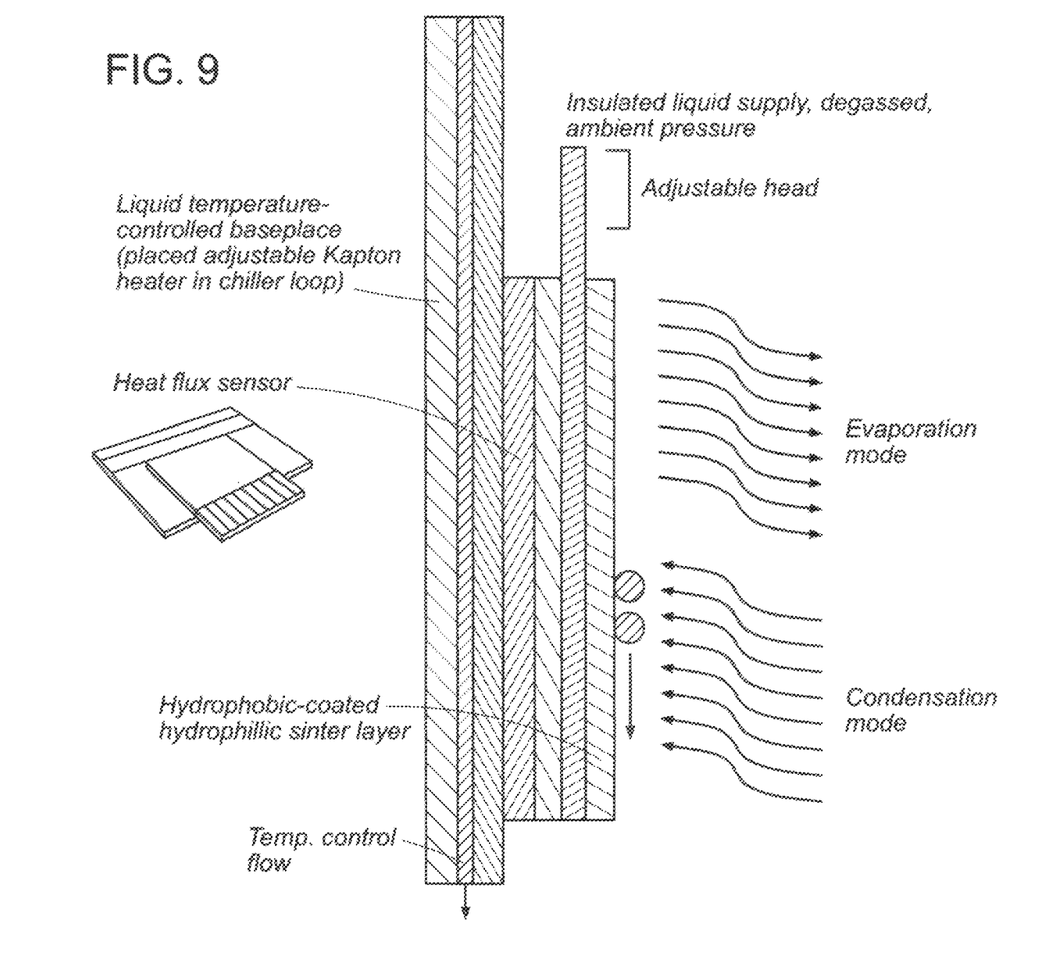
FIG. 9 is a cross-sectional view of a bi-directional data collection apparatus.

A bi-directional testing apparatus is shown in FIG. 9.

The numbers in square brackets refer to the references listed herein. The contents of these references are incorporated herein by reference.

It is recognized that modifications and variations of the present invention will be apparent to those of ordinary skill in the art and it is intended that all such modifications and variations be included within the scope of the appended claims.

REFERENCES

[1] Nenad Miljkovic, Ryan Enright, Youngsuk Nam, Ken Lopez, Nicholas Dou, Jean Sack and Evelyn Wang, *Jumping-Droplet-Enhanced Condensation on Scalable Superhydrophobic Nanostructured Surfaces*, Nano Letters, 2012
[2] Geoffroy Malpass, Maher Kalaji, Everaldo Venancio, Artur Motheo, *Electrodeposition on Nickel Felt*, Electrohimica Acta, 2004.

What is claimed is:

1. A heat exchange structure comprising:
a hydrophobic nonporous region adjacent to a hydrophilic porous media evaporator,
the hydrophilic porous media evaporator being a thermally conductive porous medium including nanostructures, the nanostructures both in central portions of the porous medium as well as on surfaces of the porous medium configured to provide a balance of capillary and viscous forces to self-regulate a liquid-vapor contact line such that active throttling is not required and the porous medium remains hydrophilic in the presence of organic contaminates, and
a hydrophobic cap layer directly over the thermally conductive porous medium.

2. The structure of claim 1 wherein the porous medium is copper.

3. The structure of claim 1 wherein the hydrophobic cap layer includes butadiene-styrene, silicone or teflon.

4. The structure of claim 1 disposed on the surface of a finned tube.

5. The structure of claim 1 disposed on the surface of a flat plate.

* * * * *